INVENTOR.
Sigurd J. Hoyrup
Richard V. Pagendarm
BY
Howard G. Russell
their ATTORNEY

United States Patent Office 3,394,635
Patented July 30, 1968

3,394,635
METHOD AND DEVICE FOR FOLDING AND BONDING CORNER PORTIONS OF A HEAT SEALABLE BOX BLANK
Sigurd J. Hoyrup, Monta Vista, and Richard V. Pagendarm, Hillsborough, Calif., assignors to Kliklok Corporation, New York, N.Y., a corporation of Delaware
Filed Aug. 9, 1966, Ser. No. 571,264
9 Claims. (Cl. 93—51)

This invention provides improvements in the art of setting up folding boxes from blanks carrying a preapplied coating of a thermoplastic adhesive and requiring heating of the blank portions at, or near, the box corners in order to render the thermoplastic material sufficiently tacky for bonding under pressure after folding of the blank into box shape.

The heating of the blank may occur basically from the side of the board which is to be bonded, or it may occur from the reverse side, in which case the heat must penetrate the board before reaching the adhesive layer.

The latter procedure requires application of heat for a period of time sufficient to permit the heat to travel through the board, and further requires dissipation of the heat while the bonded blank portion must be maintained under compression until the adhesive sets. These two time periods compel a relatively slow production rate.

If heat is applied from the side to be bonded, the heat need not penetrate the board and its application may be briefer. The application of heat may occur in various ways, one of the most common ways being by contact with a heated surface. This entails the disadvantage that a portion of the adhesive coating is transferred to the heating surface, which must be cleaned periodically, while the transferred adhesive is lost and not available for the bond of the blank portion.

Application of the heat by radiation avoids this danger, but it is a relatively slow procedure, and the amount of heat to be transferred is difficult to control. Insufficient heating leads to formation of an insecure bond, or no bond at all, while excessive heating may lead to loss of adhesive which is partially absorbed by the board.

Box blanks are formed into box shape generally by a plunger which engages the substantially flat blank and forces it into or through a forming die, whereby the portions of the blank which form the box sides are folded against the sides of the plunger.

In the use of plunger-and-die-type box forming devices a particular problem arises in connection with the heat bonding of box portions if, as it is generally the case, certain blank portions must be prefolded before the plunger engages the blank.

This is generally accomplished by inserting the blank by means of the blank transport device or feeder which carries the blank from a blank magazine stack to the die and inserts it between prefolding elements which then engage and fold certain blank portions relatively to the remainder of the blank which remains flat. Generally these blank portions are portions of the box corner structure, for example corner flaps.

As these portions or flaps are to be bonded in the setting-up of the corners, they must be heated. Contact of the heated adhesive coated surfaces with the prefolding elements, in turn, leads to the aforementioned problems of adhesive transfer, of over- or under-heating, and problems of positional adjustment of the prefolding elements in relation to the die aperture and the folded flaps which must make flat contact with the heating elements.

Still other problems arise in cases where the thermoplastic coating on the box blank is extremely thin.

In the packaging of frozen foods it has become the practice to employ paperboard having a coating of polyethylene or other synthetic resinous material or of so-called high melting point waxes (which are basically paraffine waxes modified by the addition of ethylene vinyl acetate copolymers) on one or both surfaces of the board. The principal function of the inner coating is to provide a moisture, or moisture-vapor barrier, and a main function of an outer coating is to enhance the appearance of the box, particularly of multi-color printing thereon by a glossy surface.

This glossy surface is easily marred by streaks produced by contact with folding elements, particularly if heated, and also by melting of the coating.

Boxes set up from blanks having an overall coating of a thermoplastic material were usually bonded at the corners by means of an adhesive applied at some stage of the box forming procedure, because of the extreme thinness of the coating or coatings.

For example, paperboard of a caliper of 0.016" (0.4 mm.) may have a coating thereon applied at the rate of seven pounds of thermoplastic material per 1000 square feet of surface (3.2 kg. per 100 sq. meters) of which four pounds are generally applied as a coating of the surface which forms the inside of the box and three pounds are applied as a coating for the outside surface.

The present invention permits boxes to be formed and successfully heat bonded, even though the coating of the thermoplastic material is of such extreme thinness. Not only is the application of additional adhesive made unnecessary, but the production rate of the machine and process is high, as it is unnecessary to maintain the formed and heat bonded box under compression until the heat is dissipated.

This is accomplished, in part, by limiting the heating to surface heating of the blank portions to be bonded, as distinguished from heating in depth, and by employing extremely high temperatures which may be of the order of 900 to 1000° F. (480 to 540° C.) for only very brief periods of application.

In this connection the invention comprises the step of heating the two blank portions to be bonded in unequal degrees to different temperatures by a single common heat source.

This accomplishes three further objects, namely, the quick dissipation of the heat after bonding, prevention of excessive warming up of the plunger-and-die mechanism even during long periods of operation, and, thirdly, it eliminates the danger of the preheated blank portion whose thermoplastic coating faces the plunger from adhering to the plunger walls.

During tests of the method and apparatus embodying the present invention, it was found unnecessary to provide for cooling of the plunger by passage of air or liquid through the interior of the plunger.

These and various other objects, features and advantages of this invention will appear more fully from the detailed description which follows accompanied by drawings showing, for the purpose of illustration, a preferred embodiment of the invention. The invention also resides in certain new and original features of construction and combination of elements, as well as steps and combination of steps hereinafter set forth and claimed.

Although the characteristic features of the invention which are believed to be novel will be particularly pointed out in the claims appended hereto, the invention itself, its objects and advantages, and the manner in which it may be carried out may be better understood by referring to the following description taken in connection with the accompanying drawings forming a part of it in which:

Figure 1:
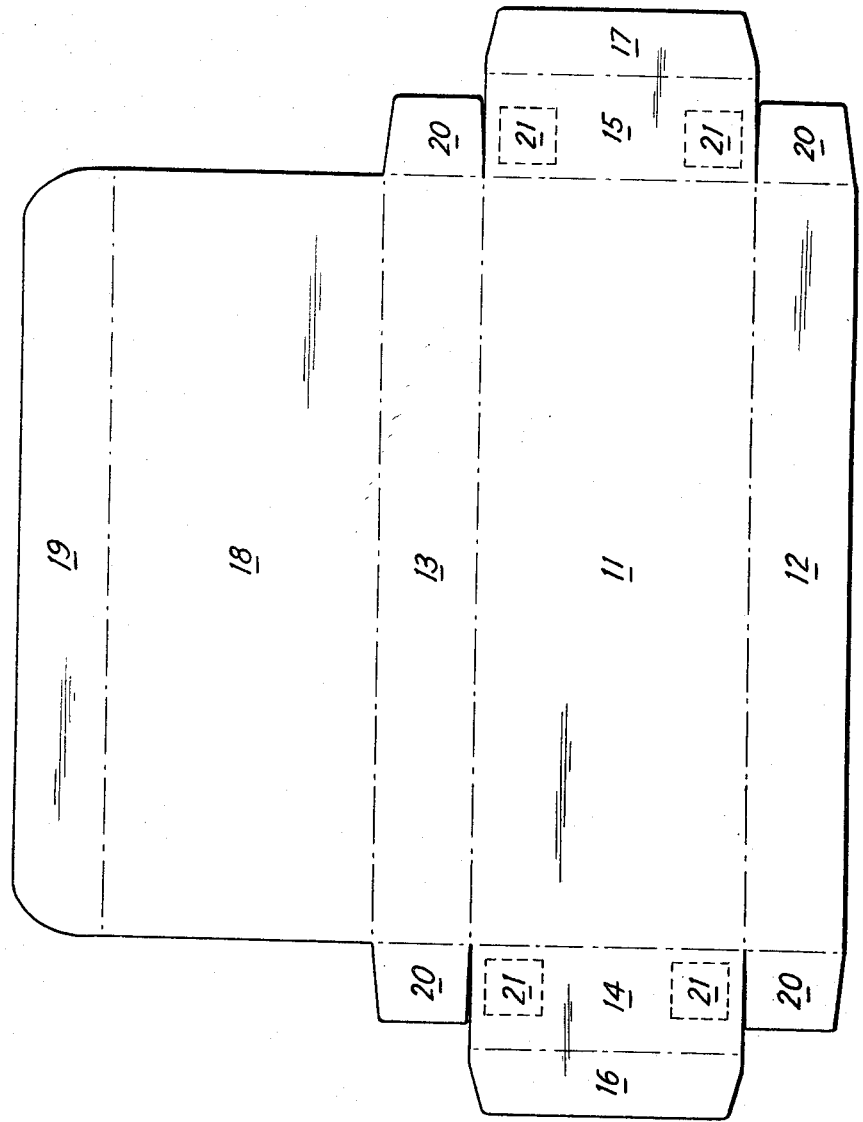
FIG. 1 shows a representative form of box blank which may be set up into box form with its corners heat bonded by the present method and device.

In the following description and in the claims various details will be identified by specific names for convenience. The names, however, are intended to be generic in their application. Corresponding reference characters refer to corresponding parts in the several figures of the drawings.

The drawings accompanying, and forming part of, this specification disclose certain specific details of construction for the purpose of explanation of broader aspects of the invention, but it should be understood that structural details may be modified in various respects without departure from the principles of the invention and that the invention may be incorporated in, and practiced by, other structures than shown.

Figure 6:
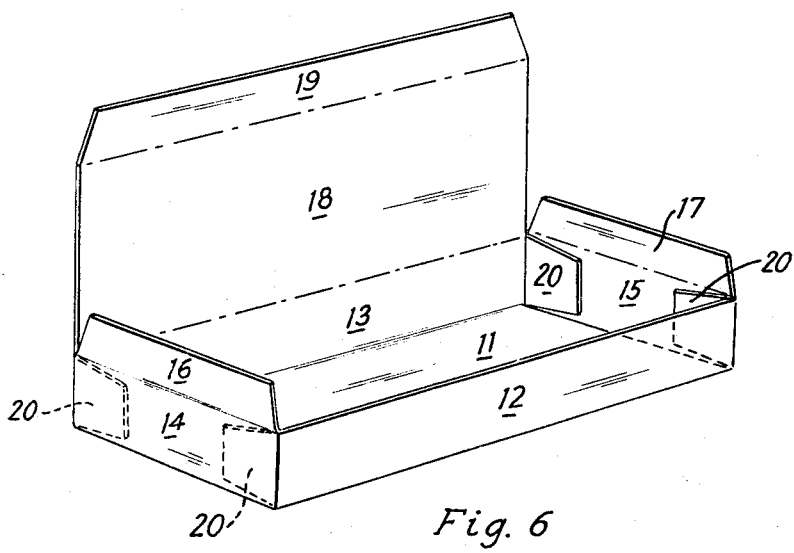
FIG. 6 shows the formed box with heat bonded corners made from the blank of FIG. 1.

The blank A of FIG. 1 is of conventional form and comprises a bottom panel 11, front and rear wall wall panels 12, 13 and end panels 14, 15 with dust flaps 16, 17. A top or cover panel 18 is articulated to the rear wall panel 13 and has a closure flap 19 on it. Corner flaps 20 are articulated to the ends of the front and rear wall panels. These corner flaps will be bonded to areas 21 of the end wall panels 14, 15 in order to maintain in set up condition the box $A^1$ to be formed from the blank (see FIG. 6).

The paperboard from which the blank A is cut may be of a caliper of the order of 12 to 20 points (0.2 to 0.5 mm.) and is coated with a relatively thin coating of a thermoplastic composition, such as polyethylene or so-called high melting point wax, as above mentioned. This coating provides good moisture-vapor proofing properties, but heretofore was generally considered as being too thin to form a satisfactory heat bond by itself.

The coating is completely sufficient for heat bonding carried out according to the present invention.

The device for setting up the blank A into box form comprises, in a generally conventional arrangement, a plunger, a forming die through which the plunger forces the blank and prefolding elements in advance of the forming die between which preforming elements a blank transport device inserts the blank, thereby prefolding certain blank portions in relation to other blank portions. The blank transport device feeds blanks, one by one, from a suitably placed stack of blanks or blank magazine to the forming die.

This general arrangement is known and is shown, for example, in the prior patent to Hoyrup et al. 3,085,479 dated Apr. 16, 1963.

Figure 2:
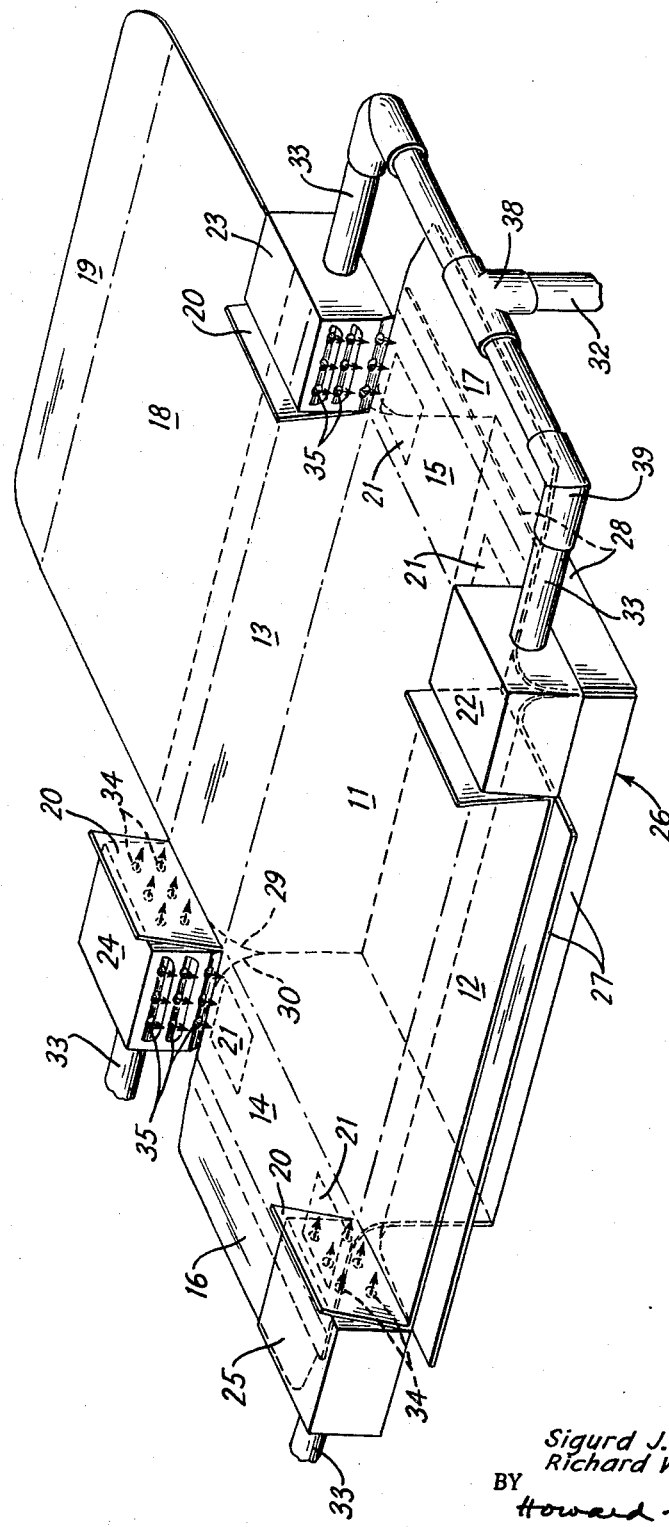
FIG. 2 is an isometric illustration of certain method aspects and mechanical details.

Referring to FIG. 2 of the present drawings, the blank A is seen placed between four hollow, generally block shaped, elements 22, 23, 24 and 25 located at the corners of a substantially rectangular folding or forming die 26. The throat of the forming die is defined by four curved plates 27, 28, 29 and 30 (see also FIGS. 3 and 4) upon whose upper horizontal portions the blank is placed.

Threaded or serrated posts 31 on opposite sides of the die (FIG. 3) engage edges of the blank and act as catches to maintain the blank in the generally horizontal position in which it is shown in FIG. 2 from the moment the blank transport device deposits the blank until the moment the plunger engages the blank to drive it through the die.

The prefolding elements 22, 23, 24, 25 also serve as preheaters, as is known for example from the aforementioned patent. In departure from the known arrangement, however, the prefolding elements are supplied with heated air under pressure, the air temperature being above the char point of the board, representative temperatures being 900 to 1000° F. (480 to 540° C.). The air is supplied to the elements 22 and 23 by a main duct 32 from which branch ducts 33 extend.

Heated air is discharged from the elements through two sets of apertures or nozzles, of which one set 34 is directed against the corner flaps 20 in a generally horizontal direction and the other set 35 is aimed downwardly at a slant against the areas 21 on the end wall panels 14, 15.

As the heated compressed air expands after being discharged from the nozzles, and correspondingly cools, the areas 21 are heated to a considerably lesser degree than the corner flaps 20.

Measurements show, for example, that for a certain box size the mean air temperature at the point of impact on the corner flaps is 950° F. (510° C.), whereas it is 500° F. (260° C.) at the area 21.

The surface of the board which comes to lie against the plunger surface during the succeeding forming operation is heated to a lower temperature—thus minimizing the danger of the coating composition adhering to the plunger—than the opposite face of the board at the flaps 20 whose surface is heated by a blast of extremely hot air, sufficient to effect surface heating and softening of the coating, but for only a very brief period of time, leaving the opposite side of the flaps 20 which faces the plunger at a materially lower temperature.

As the blank is being deposited in the position shown in FIG. 2 the flow of compressed air issuing from the nozzles 34 also creates a cushion of air between the hot wall portion of the prefolding elements and the flaps 20. Thus, as a further result of the discharge of hot air, a transfer of adhesive from the flaps to the prefolding elements is prevented, eliminating the need for periodic cleaning. As a result of the impact of the air issued from the nozzles 34 against the flaps 20, the flaps assume a position slightly beyond the vertical, as is also shown in FIG. 2. The flaps return to a substantially normal position, however, when the plunger begins to move the blank into the die and the flaps 20 out of the range of the nozzles 34.

Figure 3:
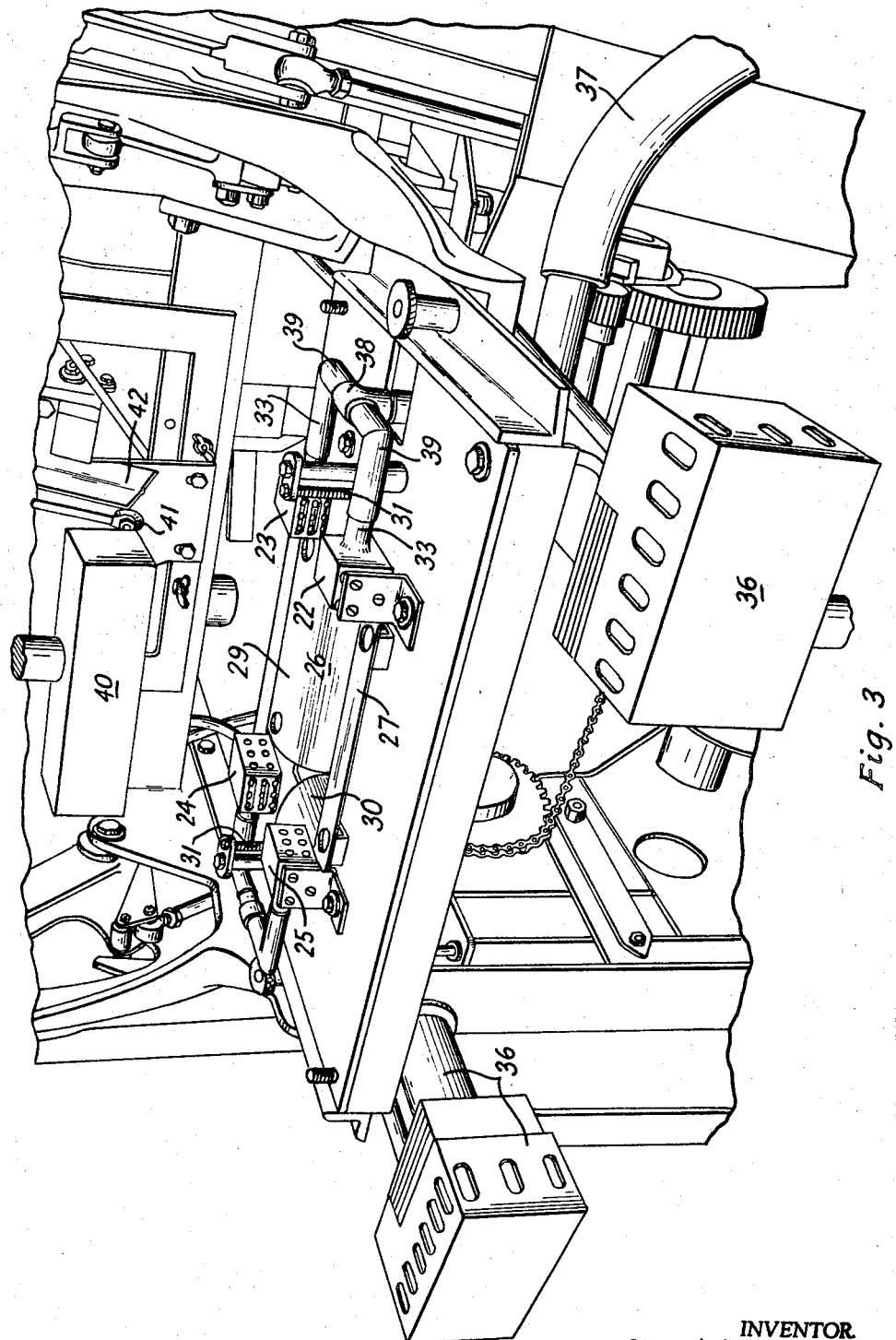
FIG. 3 is a perspective view of a portion of a machine comprising a forming die, a plunger and heating mechanism embodying the present invention, the view being of the top side of the die.
Figure 4:
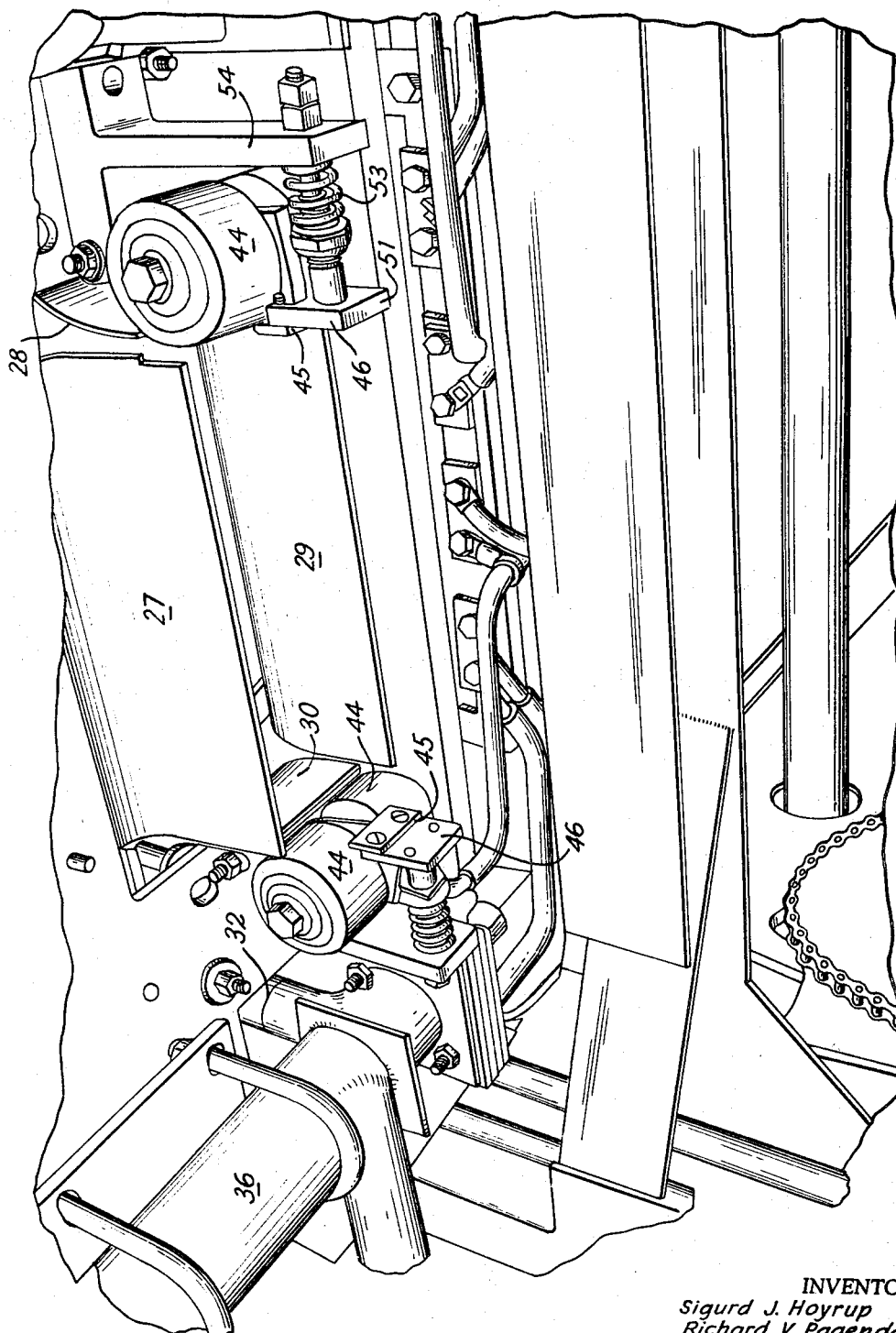
FIG. 4 is a perspective view of the bottom portion of the die and heating mechanism of the machine of FIG. 3.

Turning to FIG. 3, air of a pressure of about 1.25 p.s.i. (0.088 atm.) is supplied to an electric heater 36 through a flexible duct 37 from a compressor (not shown) at a rate of about 6 cu. ft./min. (0.17 m.³/min.). It follows that about 3 cu. ft./min. (0.085 m.³/min.) of heated air is discharged by each of the prefolding and preheating elements 22, 23, 24 and 25 through its nozzles.

The heater 36 discharges heated air through the main discharge duct 32 (see also FIG. 4) on which a T-fitting 38 is mounted. Elbows 39 provide a connection between the T-fitting 38 and the branch or inlet ducts 33.

In view of the relatively large volume of air employed, it is practicable to construct the duct work 38, 39, 32', 33 with sliding telescoping fits and it is unnecessary to make brazed connections, as the loss of air due to leakage is slight. The telescoping fit of the ductwork makes it very simple to reset the heating and prefolding elements in case of a change in the box size to be handled. Also, the accuracy of the setting of the elements 22–25 is far less critical than in a machine in which the blank portions are heated by contact, as in the aforementioned patent.

FIG. 3 shows the box forming plunger 40 above the die, and immediately to the right of it a vacuum cup 41 and a creasing bar 42 for the corner flaps are visible. These elements, as well as the transverse feeder bar 43, are parts of a conventional reciprocating blank tarnsport device, as also employed in the machine shown in the aforesaid patent.

Briefly, the cup 41 and bar 42 of the blank transport device move back and forth between a blank magazine (not visible, as it lies just above the top of the illustration) where a blank is picked up, and the folding die with its prefolding elements 22–25 between which the transport device deposits the blank while prefolding the corner flaps 20.

When the plunger 40 descends after retreat of the transport device, the prefolded corner flaps comes to lie against the plunger sides with their tacky sides facing out and the preheated areas 21 are pressed against the flaps 20 when the plunger passes through the die.

Near the bottom end of the plunger stroke the bonded areas of the blank are subjected to compression as the plunger 40 with the box thereon passes between spring-loaded rollers 44 until the top edge of the box body moves below the lower edge 45 of strip off elements 46. Thereafter the plunger 40 moves upwardly again and withdraws from the set up box.

Figure 5:
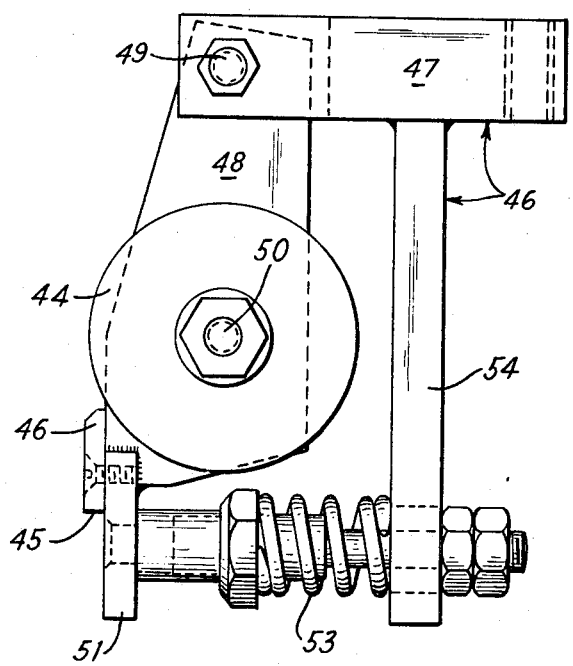
FIG. 5 is an elevational detail view of a compression device appearing in FIG. 4.

The compression and strip off device is shown in greater detail in FIG. 5 and comprises a mounting plate 47 to which a pendulous carrier plate 48 is pivotally attached at 49. The carrier plate 48 carries an axle 50 for the rollers 44 and, at its lower end, a boss 51 which carries the strip off blade 46 whose lower edge 45 engages the set up box. A compression spring 53 bearing against a depending arm 54 on the mounting plate 47 urges both roller 44 and blade 46 in the direction of the plunger.

*Examples*

(1) Boxes were set up from the blank of FIG. 1 using polyethylene coated paperboard. Size of the finished box 8½ x 3 x 1 inches (215 x 75 x 25 mm.). Production rate: 80 boxes per minute. Air temperature: 1000 F. (540° C.). Period of application of heated air to corner flaps 20 and area 21: 0.25 sec. Air impact temperature at area 21: 500° F. (260° C.).

(2) Boxes of a comparable size were set up from blanks coated with "high melting point wax." Air discharge temperature: 650° F. (243° C.). Production rate: 60 per minute. Period of application of heated air: 0.4 sec.

(3) Boxes of a comparable size were set up from blanks having a thermoplastic adhesive coating on the outside only. Air discharge temperature: 1000° F. (540° C.). Period of application of heated air: 0.25 sec. Production rate: 80 boxes per minute.

What is claimed is:

1. In a device for folding heat sealable blanks into box form and setting up the box corners by bonding a corner flap articulated to one wall to the adjacent wall over which the flap is folded, the device comprising a main folding die; a transport means for placing a blank over the mouth of the die and folding the flaps against the prefolding elements hereinafter recited; a plunger for forcing the blank through said die; and a prefolding element for each of the corner flaps against which said transport means folds the corner flaps, the improvement which is characterized by at least certain of said prefolding elements comprising two sets of air discharge apertures, one set directed against the respective corner flap folded against said element, the other set directed against the wall panel portion to which said last named flap is to be bonded; and means for supplying heated air under pressure to said element for discharge through said two sets of apertures.

2. A device as defined in the preceding claim 1 in which the stream of air discharged through said one set of apertures is directed substantially at right angles against said flap and in which the stream of air discharged through said other set is directed at a downward slant against said panel portion.

3. In a device for setting up a carton from a blank comprising corner flaps which in the set up condition of the blank overlie and are bonded to carton side wall portions by thermoplastic adhesive preapplied to the blank, the device comprising, a main die having a substantially rectangular die aperture; a plunger for driving a blank through the die to effect the setting up thereof; preholding elements at the four corners of the die; and a transport means for placing a blank over the mouth of the die and between said prefolding elements to fold the corner flaps thereagainst, the carton side walls remaining substantially flat, unfolded between said elements, the improvement which comprises air discharge apertures in two faces of each of the prefolding elements, which faces lie at an angle to each other, for the discharge of two streams of air, one against the prefolded flap folded thereagainst, the other downwardly slanted against the area of the carton wall to which said prefolded flap is to be bonded, said two streams being of unequal length and substantially at right angles to each other in plan view of the die; and means for supplying a common flow of heated air under pressure to each of said elements for discharge through its said two sets of apertures.

4. A device as defined in the preceding claim 3 in which the mean length of the said other stream of air is a multiple of the mean length of said one stream of air.

5. The method of setting up a carton from a blank comprising portions which in the set up condition of the blank are to overlie and be secured to each other by a thermoplastic composition on opposite surfaces of the blank and which method comprises transporting the blank by a transport device to a folding die at the mouth of which first portions of the blank are prefolded and preheated, whereafter a plunger moves the blank into the die to effect setting up thereof, the method being characterized by the steps of applying heated air to that side of the prefolded portions of the blank which faces away from the plunger in the subsequent setting up operation to soften the adhesive on that side by heating it to a certain temperature at which it is tacky, and substantially simultaneously applying heated air to that side of other portions of the blank to be bonded to said prefolded portions which faces the plunger in the subsequent setting up operation to preheat the adhesive on the plunger facing side to a lower temperature at which it is not yet sufficiently tacky to adhere to the plunger.

6. The method of setting up a carton from a blank of paperboard comprising portions which in the set up condition of the blank are to overlie and be bonded to each other by a thermoplastic adhesive preapplied to at least one of the two portions to be bonded, which method comprises transporting the blank by a transport device to a folding die, preheating portions of the blank while at rest above the mouth of the folding die, whereafter a plunger moves the blank into the die to effect the setting up thereof, the method being characterized by the preheating of the two blank portions to be bonded by two branch streams of compressed heated air divided from a common supply stream of heated air, one branch stream being discharged substantially at right angles to the other branch stream, the mean distance from the point of discharge of one branch stream to its area of impact on one blank portion being more than twice as great as the mean distance from the point of discharge of the other branch stream to its area of impact on the respective other blank portion to be bonded to said one blank portion so as to produce, by reason of expansion of the heated air, a lower temperature of said one blank portion than of the other blank portion.

7. The method as defined in the preceding claim 6 in which the first branch stream is directed against that side of the blank which faces the plunger and in which the said second branch stream is directed against the opposite side of the blank.

8. The method as defined in the preceding claim 6 in which the first branch stream is directed against the side of the blank which faces the plunger, and in which the second branch stream is directed against the opposite side of a blank after folding a portion of the blank against which the second branch stream is directed into an angular position with respect to plane of the remainder of the blank.

9. The method as defined in the preceding claim 6 in which the period of dwell of the blank at the mouth of the die, during which period the blank is subjected to the said branch streams of air, is so selected in relation to the temperature of the air at the point of discharge as to render the adhesive on the said other blank portion tacky while leaving the adhesive on the said one blank portion substantially non-tacky.

References Cited

UNITED STATES PATENTS 2,192,950  3/1940  Widell _____ 93—52
3,192,837  7/1965  Hoyrup et al. _____ 93—51

BERNARD STICKNEY, *Primary Examiner.*